INVENTOR.

Peter Oganovic 3,062,323
PAD OR MAT FOR GARAGES OR THE LIKE
Peter Oganovic, 103 5th St. SW., Chisholm, Minn.
Filed June 23, 1959, Ser. No. 822,227
3 Claims. (Cl. 184—106)

This invention relates to an oil absorbing pad for garages, carports and the like places.

It is the principal object of the present invention to provide an oil absorbing pad for garages and the like places adapted to be located under the vehicle and which will upon oil dripping thereon absorb the oil so that it will not get upon the floor surface or cement.

It is another object of the invention to provide an oil absorbing pad which will have the appearances at all times of being clean and which also will serve as an insulating pad on which a person may stand while working upon a vehicle.

It is still another object of the invention to provide an oil surface pad in which the oil is absorbed so that any oil that may remain upon the same is on the top surface and if it catches fire it can be readily extinguished by turning the pad upside down.

It is a further object of the invention to provide an oil absorbing pad that may be made of insulating board in which the edges thereof can be protected by aluminum or plastic band to prevent oil from penetrating the insulating board at the surfaces or edges thereof and wherein the insulating board is coated on the top and provided with an oil absorbing chemical in which the oil is absorbed without any great penetration of the insulating board material.

Other objects of the invention are to provide an oil absorbing pad, having the above objects in mind, which is of simple construction, inexpensive to manufacture, durable, light in weight, of pleasing appearance, efficient and effective in use.

Figure 1:
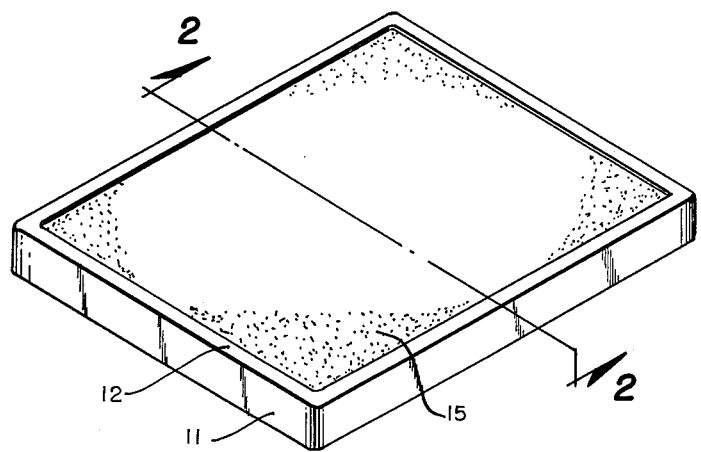
Figure 2:
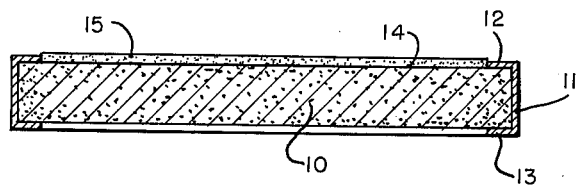
Figure 3:
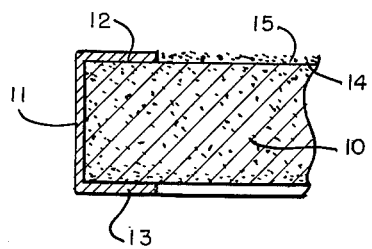
Figure 4:
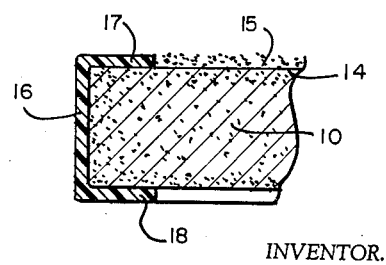

For a better understanding of the invention, reference may be had to the following detailed description taken in connection with the accompanying drawing, in which:

FIGURE 1 is a perspective view of the oil absorbing pad according to the features of the present invention, FIG. 2 is a vertical sectional view taken on line 2—2 of FIG. 1, FIG. 3 is a fragmentary and enlarged sectional view taken generally on the same line 2—2 of FIG. 1 showing more in detail the aluminum band, and FIG. 4 is a similar fragmentary sectional view of a modified form of the invention in which a synthetic rubber band is used.

Referring now particularly to FIGS. 1 to 3, 10 represents a board of insulating material such as used in the building industry and having substantial thickness. The insulating board which is the base of the oil absorbing pad of the present invention is made of crushed wood fibers that are pressed together with a suitable binding agent to form a rather tough sheet of building material. This insulating board has good insulation properties against heat and cold, and this insulation board is made from soft wood fibers which are obtained from trees such as pine and poplar trees, and the Wood Conversion Company of Colquet, Minnesota, is one of the producers of this insulation board. Surrounding this board in order to close in the edges thereof and to prevent direct access of oil thereto is a metal band, preferably of aluminum as indicated at 11. This band surrounds the edge and has top and bottom flanges 12 and 13 tightly gripping the top and bottom faces of the insulating board 10 to prevent the same from being saturated with oil from the end or edges of the board. On the top surface of the insulating board there is spread a glue or cement to provide a coating thereover as indicated at 14 and on which as indicated at 15 there is disposed an oil absorbing chemical. This chemical is known in the trade as Dryiteor Dryrite, and this chemical has a composition of 56.87% $SiO_2$, 12.01% $Al_2O_3$, 7.12% $MgO$, 3.21% $Fe_2O_3$, 0.22% $FeO$, 0.99% $TiO_2$, 0.08% $MnO_2$, 1.18% $CaO$, 0.11% $Na_2O$, 0.51% $K_2O$, 0.55% $P_2O_5$, and having a total ignition loss of 17.15%; this chemical is of the type that is used in shops utilizing oil.

This pad may also be formed as shown in FIG. 4 with an insulating band 16 formed of plastic and having top and bottom flanges 17 and 18. This band is preferably formed of synthetic rubber such as neoprene, and has the flanges 17 and 18 tightly gripping the top and bottom edge surfaces of the insulating board 10. The board 10 is similarly coated with glue and with the oil absorbing chemical 15 spread on the top thereof.

The pad is laid down on the cement floor or floor surface under the car to absorb all of the oil that drips from the automobile engine or differential. The insulating board material will have absorbed all of the oil which passes through the chemical. The metal or synthetic rubber band prevents the edges of the pad from getting into direct contact with the oil and is crimped or tightly squeezed by its flanges for securement of the same to the edges of the insulating board.

The pad will also serve as an insulation on the cement floor for one working upon the ignition system of the automobile. In the event of fire, the same is contained on the surface of the pad and can be easily controlled and prevented from spreading by simply turning the pad upside down. The use of this pad makes it possible for the chemical to absorb the oil and grease and the insulating material board absorbs what remains. The present invention is constructed so as to prevent the passage of electricity through the pad to the ground, and thereby gives adequate insulation to one standing upon the pad.

It will be apparent that these pads can be made of any desired size.

While various changes may be made in the detailed construction, it shall be understood that such changes shall be within the spirit and scope of the present invention as defined by the appended claims.

What is claimed is:

1. As a new article of manufacture, a pad for use in garages or the like, said pad comprising an absorbent board having an oil absorbing chemical secured to the upper surface thereof by means of an adhesive, and a band surrounding the outer edge portions of said board and said band having upper and lower inwardly directed flange portions snugly and tightly engaging the top and bottom surfaces of said board, said flange portions maintaining the surfaces of the board out of direct contact with a supporting surface.

2. As a new article of manufacture, a pad for use in garages or the like, said pad comprising an absorbent board having an oil absorbing chemical secured to the upper surface thereof by means of an adhesive, and a band surrounding the outer edge portions of said board and said band having upper and lower inwardly directed flange portions snugly and tightly engaging the top and bottom suraces of said board, said flange portions maintaining the surfaces of the board out of direct contact with a supporting surface, said board being made of fibers that are pressed together and held together by a binding agent.

3. As a new article of manufacture, a pad for use in garages or the like, said pad comprising an absorbent board having an oil absorbing chemical secured to the upper surface thereof by means of an adhesive, and a band surrounding the outer edge portions of said board and said band having upper and lower inwardly directed flange portions snugly and tightly engaging the top and bottom surfaces of said board, said flange portions maintaining the surfaces of the board out of direct contact with a supporting surface, said board being made of fibers that are pressed together and held together by a binding agent, said flange portions only extending across the outer peripheral edges of the top and bottom surfaces so that the major portions of the top and bottom surfaces are exposed.

References Cited in the file of this patent

UNITED STATES PATENTS

| | | |
|---|---|---|
| 1,094,210 | Hughes | Apr. 21, 1914 |
| 2,057,162 | Richey | Oct. 13, 1936 |
| 2,619,653 | Young | Dec. 2, 1952 |
| 2,805,204 | Adams | Sept. 3, 1957 |